No. 817,453. PATENTED APR. 10, 1906.
M. J. SMITH.
APPARATUS FOR RUBBING OR TREEING BOOTS AND SHOES.
APPLICATION FILED DEC. 1, 1904.
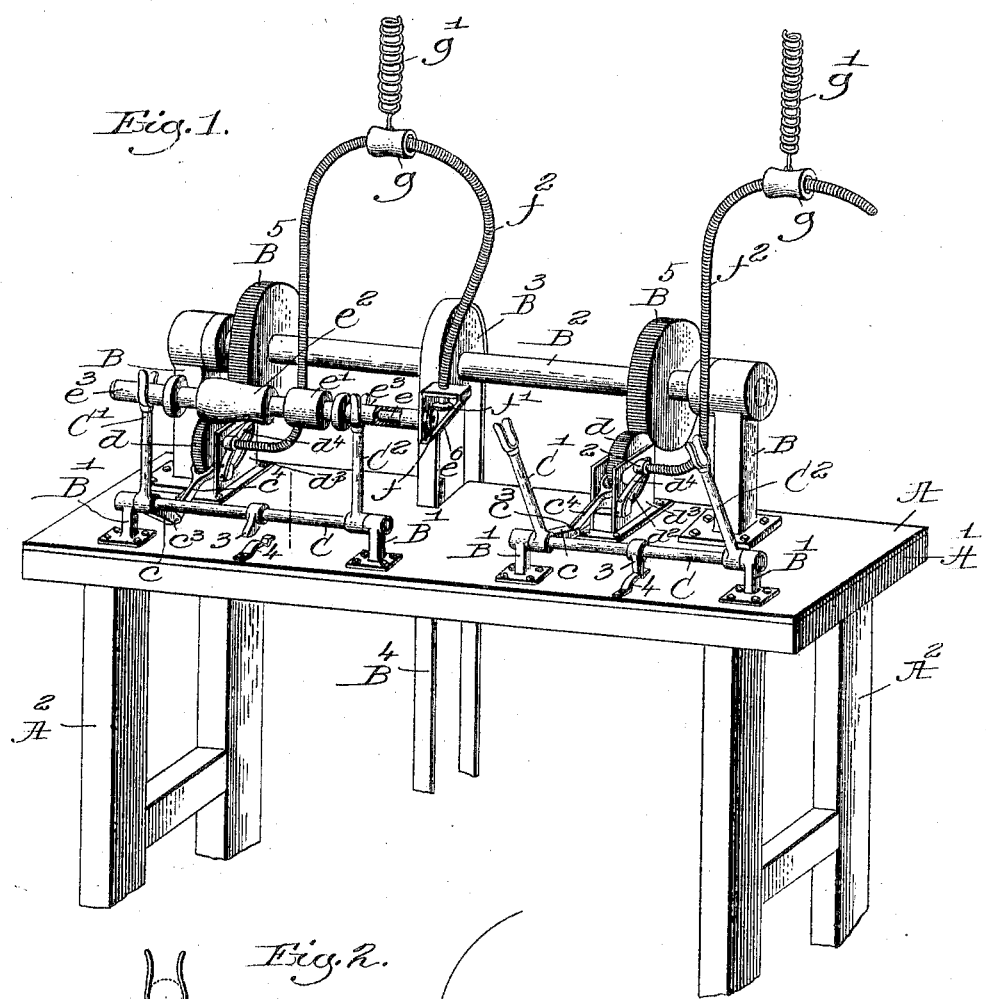
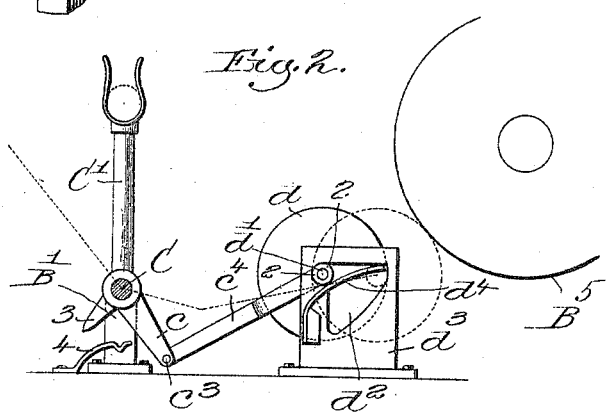
Witnesses:
Inventor.
Martin J. Smith,
by Crosby & Gregory
Attys.

UNITED STATES PATENT OFFICE.

MARTIN J. SMITH, OF BROCKTON, MASSACHUSETTS, ASSIGNOR OF ONE-HALF TO FREDERICK L. SMITH, OF BROCKTON, MASSACHUSETTS.

APPARATUS FOR RUBBING OR TREEING BOOTS AND SHOES.

No. 817,453.     Specification of Letters Patent.     Patented April 10, 1906.

Application filed December 1, 1904. Serial No. 234,983.

*To all whom it may concern:*

Be it known that I, MARTIN J. SMITH, a citizen of the United States, residing at Brockton, county of Plymouth, and State of Massachusetts, have invented an Improvement in Apparatus for Rubbing or Treeing Boots and Shoes, of which the following description, in connection with the accompanying drawings, is a specification, like characters on the drawings representing like parts.

This invention has for its object the production of a novel apparatus for rubbing or treeing leather in the manufacture of boots and shoes. The rubbing action on the stock is done by rubbing-surfaces connected with a shaft adapted to be revolved automatically by or through a flexible or so-called "spiral" shaft whenever the shaft having the rubbing-surfaces is taken out of the holding means that retains the same in its inoperative position or position of rest, the replacing of the shaft having the rubbing-surfaces in its holding means, as when it is not to be used, disconnecting the driven wheel connected with the spiral shaft from its continuously-moving actuator, shown as a toothed wheel on a shaft that is revolved continuously by a belt or otherwise driven by any usual motor.

Figure 1 shows in perspective an apparatus for rubbing or treeing boots or shoes embodying my invention; and Fig. 2 is a detail to be referred to, the driven wheel for the spiral shaft being shown as disengaged, the dotted lines showing it engaged as will be the case when the shaft carrying the rubbing-surfaces is removed from its holder.

In the drawings, A represents a bed-plate sustained by a table-top A', supported in any manner, as by legs $A^2$. The bed-plate is provided with uprights or stands B B', that sustain, respectively, the main shaft $B^2$ and the shafts C, forming parts of the holder to be described. The main shaft has a pulley $B^3$, that is shown as embraced by a belt $B^4$, driven in any usual manner, said shaft having two so-called "continuously-rotatable actuators," shown as toothed wheels $B^5$.

The shaft C has two forked arms C' $C^2$. The arm C' has an extension c, that is jointed at $c^3$ to a movable bearing $c^4$, shown as forked at one end to embrace the driven wheel d, fast on a short shaft d', the latter having its bearings at opposite sides said wheel in the forks of the bearing, one end of said shaft being extended through a hub or boss 2 of the bearing and the boss entering an opening $d^2$ in a stand $d^3$, (shown separately in Fig. 2,) said stand having a locking device $d^4$ to sustain said shaft when in its inoperative position, (see Fig. 2, full lines, and at the left, Fig. 1,) the shaft e holding the rubbing-surfaces e' $e^2$ of any usual shape being then sustained in the forks of the arms C' $C^2$. The stand $d^3$ also has a locking device $d^4$, shown as a spring that acts on the boss 2 when the latter is pushed into its position shown by dotted lines, Fig. 2, and full lines at right of Fig. 1, the wheel d at such time being maintained in operative engagement with the continuously-rotatable driver $B^5$ by not only the action of the spring, but due also to the weight of the arms C' $C^2$ of the holder, then turned outwardly into the dotted-line position, Fig. 2, and as shown at the right in Fig. 1.

The shafts e have sleeve-like hand-grips $e^3$ near each end, one being broken out in Fig. 1, that contact with the forks of the arms C' $C^2$ when the shafts e are placed in the holders and the latter are turned into the full-line positions at the left of Fig. 1 and in Fig. 2.

When a holder is turned outwardly, as shown at the right, Fig. 1, and by dotted lines, Fig. 2, the workman engages the hand-grips of the rubbing device, removes it from the holder, and holding the device firmly applies the rubbing-surface to be used to the stock, moving it over the stock as required. When the holder is turned outwardly, as represented, it is locked there by locking means, shown as a lug 3, carried by a shaft C, and a spring-catch 4.

The shaft e has at one end a bevel-gear f, that is engaged by a bevel-gear f' at the end of a flexible or wire shaft $f^2$, the opposite end of which is attached to the short shaft d'. The handpiece $e^3$ at the right-hand end of the shaft e has a connected bearing $e^6$, shown as sustaining the shaft e and the part of the flexible shaft having the bevel-gear f'. The flexible shaft is extended loosely in a rest g, sustained by a spring g'.

I shall designate the sleeves $e^3$ in the claims as "handholds." The shape and the material of the rubbing devices or members may be changed according to the work to be done.

Having fully described my invention, what

I claim as new, and desire to secure by Letters Patent, is—

1. In apparatus for rubbing or treeing stock in boots and shoes, a shaft having a rubbing device and a gear, handholds loose on said shaft, one of said handholds having a bearing, a flexible shaft having a gear engaging the gear on said first-named shaft, another gear having its shaft fast on one end of said flexible shaft, a bearing to sustain the shaft of said other gear, an actuator, and means to effect the engagement of said other gear with said actuator when the flexible shaft and the shaft having the rubbing members are to be rotated.

2. In apparatus for rubbing or treeing stock in boots and shoes, a shaft having a rubbing device and a gear, handholds loose on said shaft, one of said handholds having a bearing, a flexible shaft having a gear engaging the gear on said first-named shaft, another gear having its shaft fast on one end of said flexible shaft, a bearing to sustain the shaft of said other gear, an actuator, means to effect the engagement of said other gear with said actuator when the flexible shaft and the shaft having the rubbing members are to be rotated, and means to lock said other gear in driving engagement with said actuator.

3. In apparatus for rubbing or treeing stock in boots and shoes, a shaft having a rubbing device and a gear, handholds loose on said shaft, one of said handholds having a bearing, a flexible shaft having a gear engaging the gear on said first-named shaft, another gear having its shaft fast on one end of said flexible shaft, a bearing to sustain the shaft of said other gear, bearings to sustain the latter shaft, means to sustain said bearing loosely, an actuator, and means to slide said bearing in its sustaining means to effect the engagement or disengagement of said other gear with said actuator according as it is desired to rotate said rubbing members or maintain the same at rest.

4. In an apparatus of the class described, a continously-rotatable actuator, a shaft having a rubbing device, handholds loose thereon and a gear at one end thereof, a gear to be driven by said actuator, a flexible shaft connecting said driven gear and the shaft having the rubbing-surfaces, a movable bearing sustaining the axis of the driven gear, means to sustain said bearing, a movable holder shaped to sustain said handholds, and means connecting said holder with said bearing whereby when said holder occupies one position the bearing sustaining the shaft of said driven gear is placed in position to render said driven gear inoperative, and in its other position, as when the shaft having the rubbing members is being used, will be rotated.

In testimony whereof I have signed my name to this specification in the presence of two subscribing witnesses.

MARTIN J. SMITH.

Witnesses:
CHARLES C. MORTON.
CHARLES M. RIPLEY.